US008995030B2

(12) United States Patent
Kakuta et al.

(10) Patent No.: US 8,995,030 B2
(45) Date of Patent: Mar. 31, 2015

(54) IMAGE FORMING APPARATUS

(71) Applicant: KYOCERA Document Solutions Inc., Osaka (JP)

(72) Inventors: Masayuki Kakuta, Osaka (JP); Keiji Okumura, Osaka (JP)

(73) Assignee: KYOCERA Documant Solutions Inc., Osaka-shi (JP)

( * ) Notice: Subject to any disclaimer, the term of this patent is extended or adjusted under 35 U.S.C. 154(b) by 0 days.

(21) Appl. No.: 14/226,284

(22) Filed: Mar. 26, 2014

(65) Prior Publication Data

US 2014/0293378 A1 Oct. 2, 2014

(30) Foreign Application Priority Data

Mar. 29, 2013 (JP) ................. 2013-070812

(51) Int. Cl.
*H04N 1/04* (2006.01)
*H04N 1/00* (2006.01)

(52) U.S. Cl.
CPC ......... *H04N 1/00559* (2013.01); *H04N 1/0083* (2013.01); *H04N 2201/0091* (2013.01)
USPC .......................................... 358/474; 358/498

(58) Field of Classification Search
CPC ....... H04N 17/00; H04N 17/004; H04N 1/40; H04N 21/6118; H04N 21/6168; H04N 21/6175; H04N 1/00891; H04N 1/00896; H04N 1/00928; H04N 2201/0094
USPC ............. 358/1.14, 1.13, 1.12, 1.15, 498, 474, 358/407, 496; 382/112, 103, 190; 399/117, 399/119, 285, 33, 69, 88, 9
See application file for complete search history.

(56) References Cited

U.S. PATENT DOCUMENTS

| 4,922,392 | A  | * | 5/1990  | Egami et al.  | 362/218 |
| 6,175,406 | B1 | * | 1/2001  | Iizuka et al. | 355/75  |
| 7,055,949 | B2 | * | 6/2006  | Ohashi        | 347/104 |
| 7,062,576 | B2 | * | 6/2006  | Ohmura et al. | 710/35  |
| 7,063,473 | B2 | * | 6/2006  | Ohashi et al. | 400/642 |
| 7,391,334 | B2 | * | 6/2008  | Miyake et al. | 340/653 |
| 7,583,416 | B2 | * | 9/2009  | Brugger et al.| 358/474 |
| 8,134,737 | B2 | * | 3/2012  | Sai et al.    | 358/1.16|
| 8,290,381 | B2 | * | 10/2012 | Ishizuka et al.| 399/15 |
| 8,746,681 | B2 | * | 6/2014  | Mizuno et al. | 271/145 |
| 2013/0168680 | A1 | * | 7/2013 | Shin et al.  | 257/59  |

FOREIGN PATENT DOCUMENTS

JP   2005300796 A   10/2005

* cited by examiner

*Primary Examiner* — Negussie Worku
(74) *Attorney, Agent, or Firm* — Alleman Hall McCoy Russell & Tuttle LLP

(57) ABSTRACT

An image forming apparatus according to one aspect of the present disclosure includes an apparatus body, a document sheet feed apparatus, a wiring cord, a guide portion, and a wiring cord cover. The apparatus body includes a document sheet reading portion therein. The document sheet feed apparatus is configured to be openable and closable relative to a document sheet placing surface of the apparatus body. The wiring cord is configured to electrically connect between the apparatus body and the document sheet feed apparatus. The guide portion is configured to surround the wiring cord. The wiring cord cover is mounted detachably to the apparatus body in a state where the wiring cord cover has the wiring cord disposed therein.

8 Claims, 16 Drawing Sheets

IMAGE FORMING APPARATUS

INCORPORATION BY REFERENCE

This application is based upon and claims the benefit of priority from the corresponding Japanese Patent Application No. 2013-070812 filed on Mar. 29, 2013, the entire contents of which are incorporated herein by reference.

BACKGROUND

The present disclosure relates to image forming apparatuses.

In some image forming apparatuses, a document sheet reading portion is disposed in an apparatus body, and a document sheet feed apparatus is mounted so as to be closable and openable relative to a document sheet placing surface of the apparatus body. A contact glass is fitted into the document sheet placing surface of the apparatus body, and the document sheet reading portion optically reads a document sheet through the contact glass. The document sheet feed apparatus feeds the document sheet to the contact glass in a state where the document sheet placing surface is closed.

The document sheet feed apparatus includes a driving system by which a document sheet is fed to the contact glass. A power supply from which power is supplied to the driving system is typically provided in the apparatus body, and a wiring cord for power supply extends from the apparatus body to the document sheet feed apparatus.

As a conventional art, an image forming apparatus is disclosed in which the wiring cord is covered with an exterior member so as to prevent appearance from being spoiled due to the wiring cord being exposed to the outside between the apparatus body and the document sheet feed apparatus and avoid interference between the wiring cord and the environment including persons around the wiring cord.

As a wiring path of the wiring cord, a wiring path that extends externally from an opening formed on the outer side of the document sheet feed apparatus and is inserted into a connector portion provided on the rear side of the apparatus body, is used in general.

The external member of the conventional art is mounted, after the wiring cord is disposed in the wiring path, so as to cover the wiring cord on the rear side of the wiring cord disposed in the wiring path. Therefore, in conventional arts, attention needs to be paid in assembling work so as to prevent the wiring cord from being caught by the external member.

SUMMARY

An image forming apparatus according to one aspect of the present disclosure includes an apparatus body, a document sheet feed apparatus, a wiring cord, a guide portion, and a wiring cord cover. The apparatus body includes a document sheet reading portion therein. The document sheet feed apparatus is configured to be openable and closable relative to a document sheet placing surface of the apparatus body. The wiring cord is configured to electrically connect between the apparatus body and the document sheet feed apparatus. The guide portion is configured to surround the wiring cord. The wiring cord cover is mounted detachably to the apparatus body in a state where the wiring cord cover has the wiring cord disposed therein.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. In the below description, as an exemplary image forming apparatuses of the present disclosure, a copy machine having a document sheet reading function will be described.

First Embodiment

Figure 1:
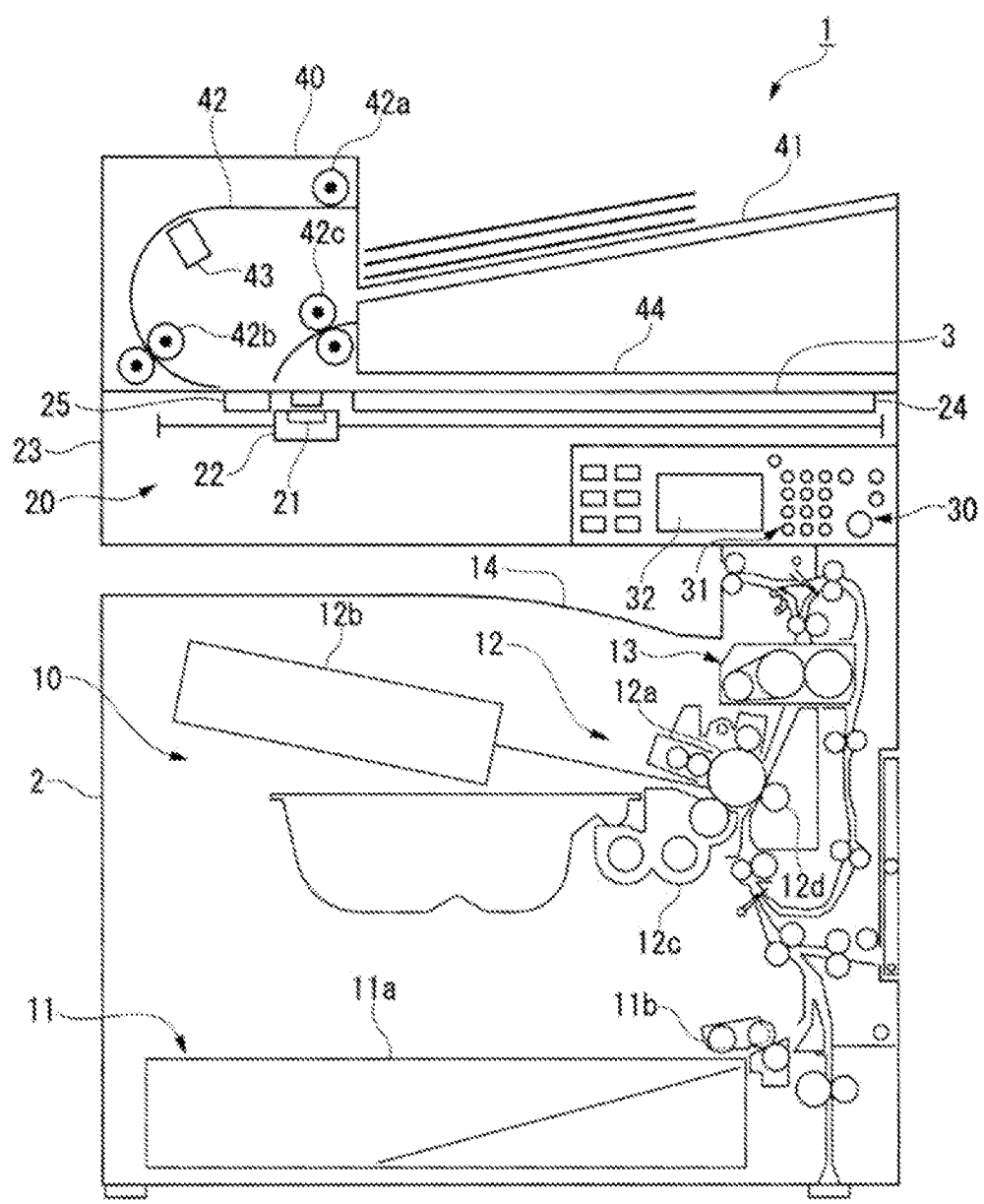
FIG. 1 is a schematic diagram illustrating main components of a copy machine according to a first embodiment of the present disclosure.

FIG. 1 is a schematic diagram illustrating main components of a copy machine 1 according to a first embodiment of the present disclosure.

The copy machine 1 includes an apparatus body 2, and a document sheet feed apparatus 40 mounted so as to be openable and closable relative to a document sheet placing surface 3 of the apparatus body 2. The apparatus body 2 includes therein a printing portion 10, and a first document sheet reading portion (document sheet reading portion) 20, and includes an operation portion 30 on the outer side thereof.

The printing portion 10 prints an image on a print sheet, to output the print sheet with the image as a printed object. The printing portion 10 includes a sheet feed portion 11, a toner image forming portion 12, a fixing portion 13, a sheet discharge tray 14, and the like. The sheet feed portion 11 includes a sheet feed cassette 11a that can store a plurality (for example, about tens to hundreds) of standard-size paper sheets, and that can be drawn from the front surface of the copy machine 1. An uppermost paper sheet among the paper sheets stored in each sheet feed cassette 11a is fed by a pickup roller 11b being driven, and is conveyed to the toner image forming portion 12.

The toner image forming portion 12 forms, on the paper sheet, a toner image corresponding to an image to be printed, and includes a photosensitive drum 12a, an exposure portion 12b, a developing portion 12c, a transfer portion 12d, and the like. On the photosensitive drum 12a, an electrostatic latent image corresponding to the image to be printed is formed. The photosensitive drum 12a is a cylindrical photosensitive member that carries a developed toner image. The exposure portion 12b applies, to the photosensitive drum 12a, laser light by which the electrostatic latent image is formed on a surface of the photosensitive drum 12a. The developing portion 12c supplies toner to the photosensitive drum 12a having the electrostatic latent image formed thereon, to develop the electrostatic latent image into a toner image. The transfer portion 12d transfers the toner image carried by the photosensitive drum 12a, onto a paper sheet conveyed from the sheet feed portion 11.

The fixing portion 13 heats and pressurizes the toner image having been transferred (formed) onto the paper sheet by the toner image forming portion 12, to fix the toner image on the paper sheet. Thereafter, the paper sheet having been subjected to the fixing process is discharged (outputted) to the sheet discharge tray 14 as a printed object on which a desired image is printed. The sheet discharge tray 14 is a portion on which the printed objects outputted from the fixing portion 13 are accumulated, and is disposed on the printing portion 10.

The first document sheet reading portion 20 reads a document sheet set on the document sheet placing surface 3, and obtains document sheet image data representing an image on the document sheet. The first document sheet reading portion 20 includes a CCD (Charge Coupled Device) sensor 21, a carriage 22, a document sheet table 23, and the like. The carriage 22 has the CCD sensor 21 mounted thereon, and reads a document sheet set on the document sheet placing surface 3 or document sheets or the like that are sequentially fed by the document sheet feed apparatus 40. The document sheet table 23 includes a contact glass 24 and a slit-like contact glass 25.

Specifically, in a case where a document sheet set on the contact glass 24 is read, the document sheet is read by the CCD sensor 21 while the carriage 22 is moving in the longitudinal direction of the document sheet table 23. On the other hand, in a case where document sheets fed by the document sheet feed apparatus 40 are read, the document sheets sequentially fed by the document sheet feed apparatus 40 are read by using the CCD sensor 21 through the slit-like contact glass 25 in a state where the carriage 22 is at a position (a position below the slit-like contact glass 25) opposing the slit-like contact glass 25.

The operation portion 30 outputs a signal (operation signal) corresponding to an operation performed by a user, and indicates various information such as information indicating a state of the copy machine 1. The operation portion 30 includes an operation key 31 and an operation display portion 32. The operation key 31 is a hardware key that functions as a copy start key, a copy stop/clear key, a numerical keypad (number input key), a function switching key, and the like.

The operation display portion 32 includes a display portion that displays a predetermined image, and an operation portion that outputs an operation signal corresponding to an operation performed on a display screen of the display portion. The display portion is implemented as, for example, a liquid crystal panel or an organic EL panel. Further, the operation portion is implemented as, for example, a touch panel disposed so as to oppose the display screen of the display portion. The operation portion outputs, as the operation signal, a signal representing coordinates of a portion pressed by a user.

The document sheet feed apparatus 40 is an apparatus that performs sequential automatic feeding of document sheets to be read. The document sheet feed apparatus 40 includes a sheet feed tray 41, a document sheet conveying path 42, a second document sheet reading portion 43, and a sheet discharge tray 44. On the sheet feed tray 41, a plurality of document sheets can be stored. An uppermost document sheet among the document sheets stored in the sheet feed tray 41, is fed by a pickup roller 42a being driven, and introduced into the document sheet conveying path 42.

The document sheet conveying path 42 is connected to the sheet discharge tray 44 via the slit-like contact glass 25. The document sheet introduced into the document sheet conveying path 42 by the pickup roller 42a is conveyed to the slit-like contact glass 25 by a conveying roller 42b, and thereafter discharged onto the sheet discharge tray 44 by a sheet discharge roller 42c.

The second document sheet reading portion 43 reads one side surface (the surface opposite to that read by the first document sheet reading portion 20) of a document sheet, and obtains document sheet image data representing an image on the document sheet. The second document sheet reading portion 43 is implemented as a CCD sensor oriented toward the document sheet conveying path 42. Thus, the copy machine 1 of the present embodiment includes two document sheet reading portions, and can scan both side surfaces of a document sheet.

The document sheet feed apparatus 40 having the above structure is electrically connected to the apparatus body 2 via a wiring cord C described below.

Hereinafter, a structure of a wiring cord cover 50, of the wiring cord C, disposed between the apparatus body 2 and the document sheet feed apparatus 40 will be described with reference to FIG. 2 to FIG. 9.

Figure 2:
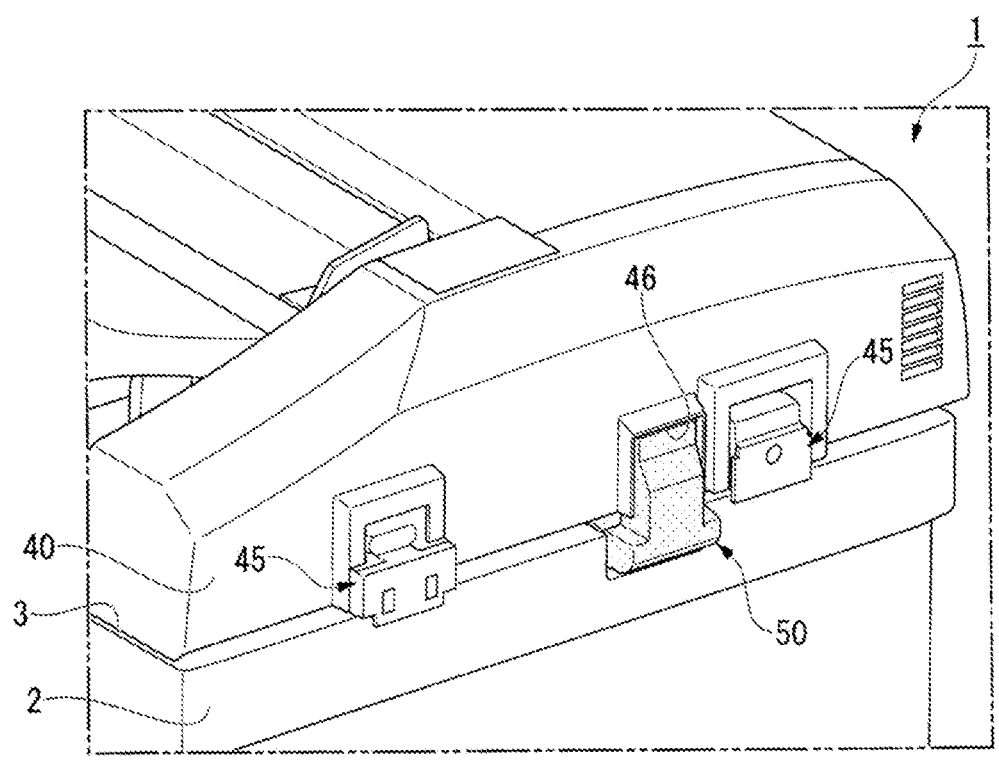
FIG. 2 is a perspective view of an outer appearance of a rear surface side of the copy machine according to the first embodiment of the present disclosure.
Figure 3:
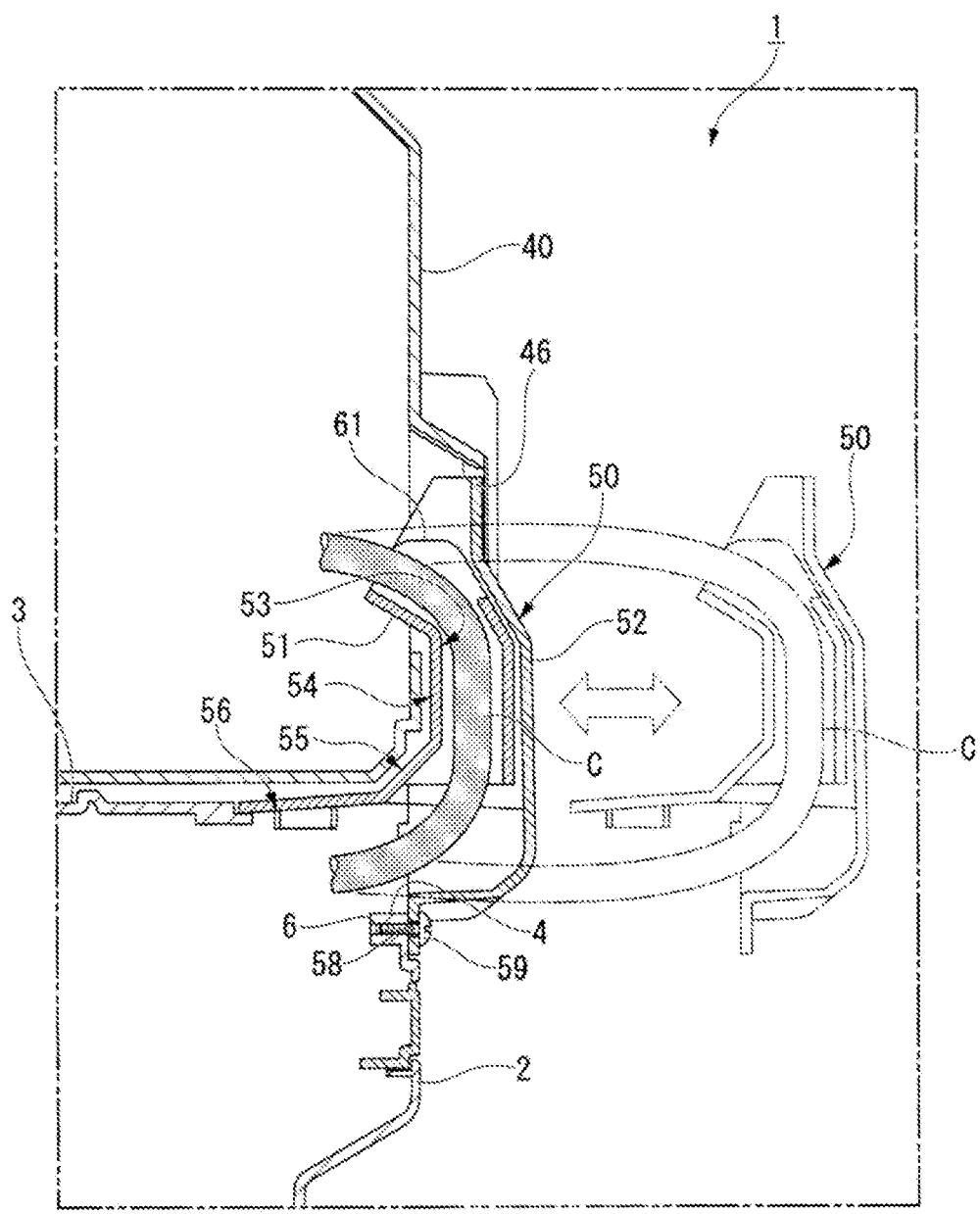
FIG. 3 is a cross-sectional view illustrating a region in which a wiring cord cover of the copy machine is mounted according to the first embodiment of the present disclosure.
Figure 4:
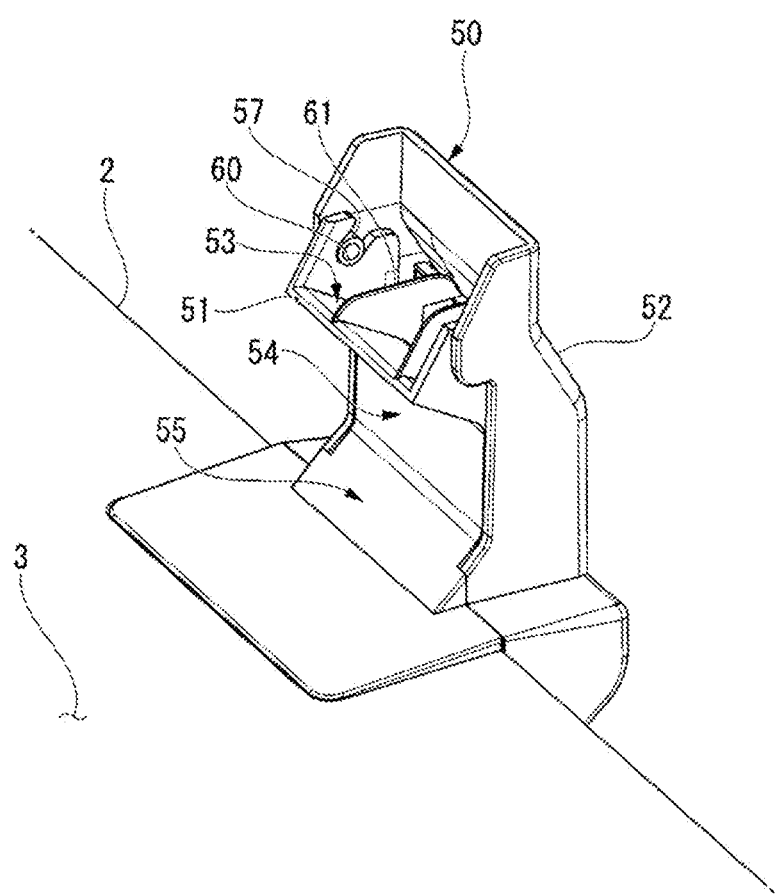
FIG. 4 is a perspective view illustrating an outer appearance of a front surface side of the wiring cord cover mounted to the apparatus body according to the first embodiment of the present disclosure.
Figure 5:
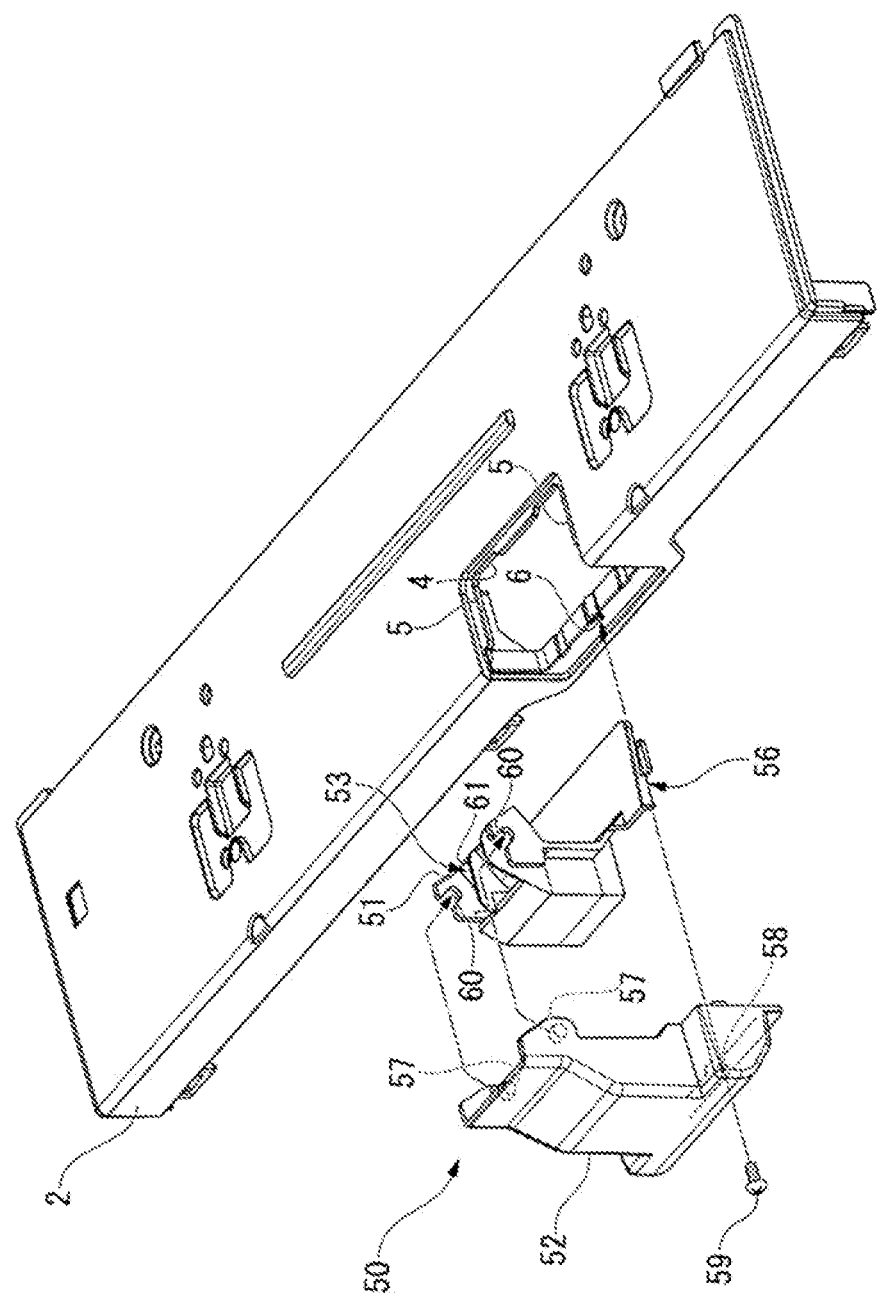
FIG. 5 is an exploded perspective view illustrating a structure of the wiring cord cover according to the first embodiment of the present disclosure.
Figure 7A:
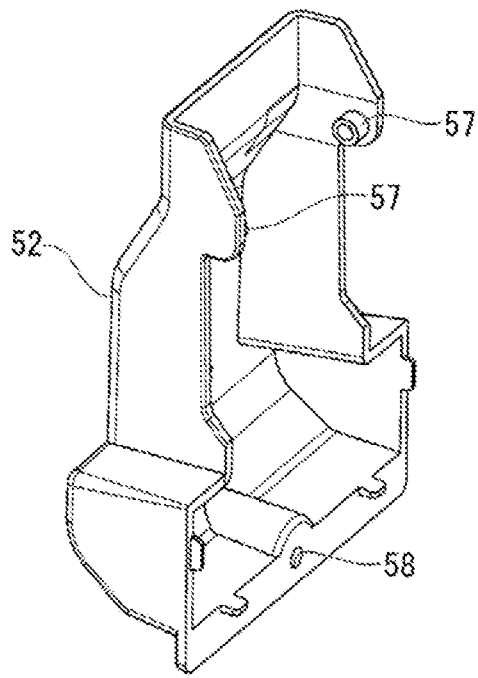
FIG. 7A and FIG. 7B are each a perspective view illustrating a structure of a second cover member according to the first embodiment of the present disclosure.
Figure 8:
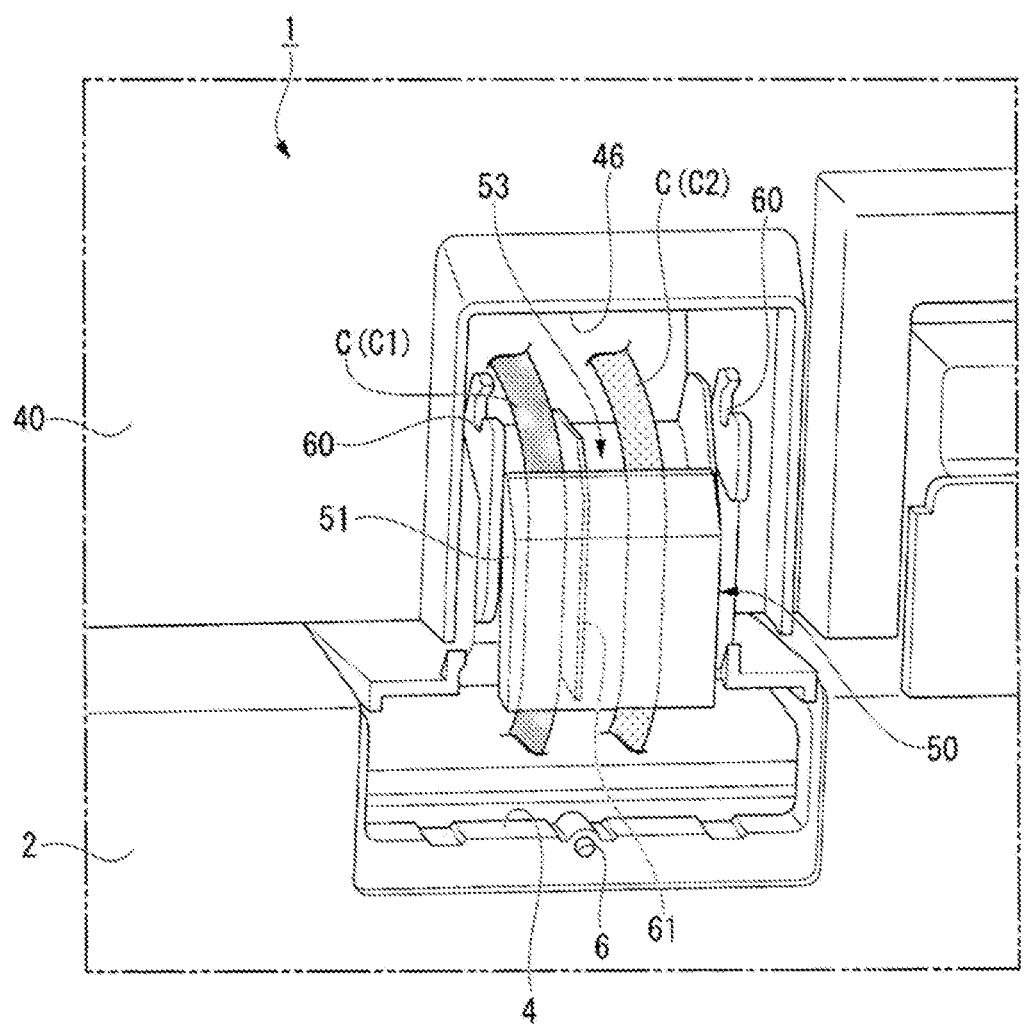
FIG. 8 is an enlarged perspective view illustrating a region in which the wiring cord cover of the copy machine is mounted according to the first embodiment of the present disclosure.
Figure 9:
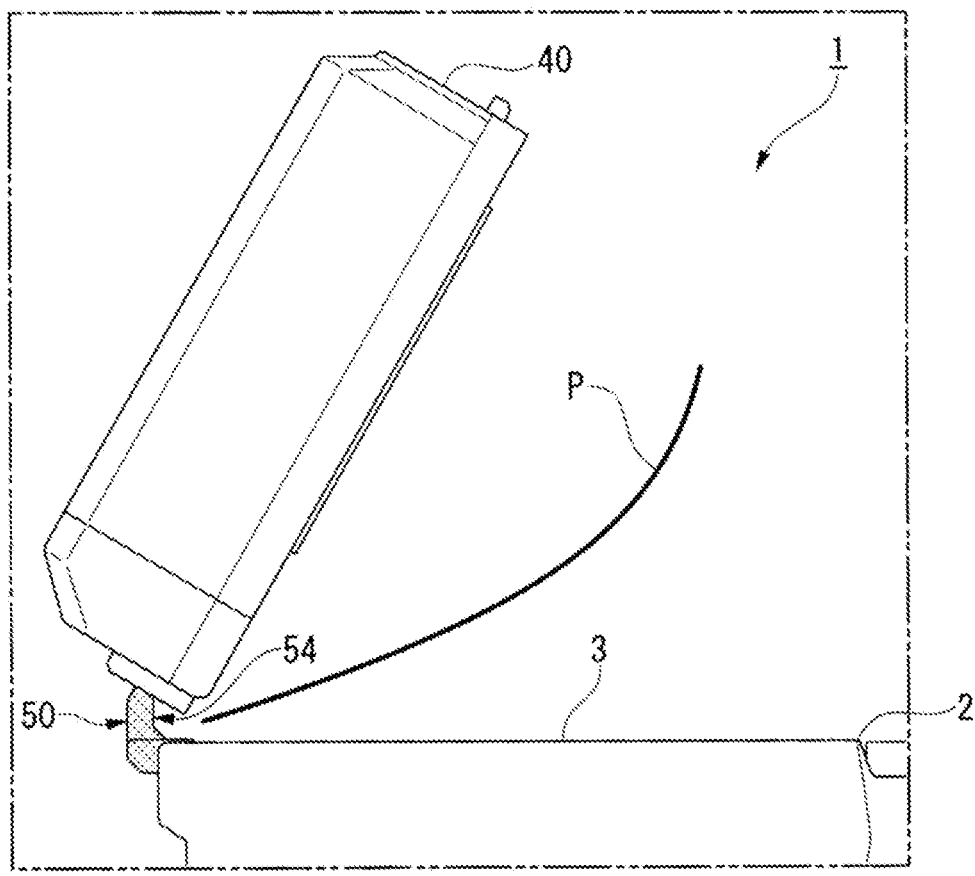
FIG. 9 illustrates one of functions of the wiring cord cover according to the first embodiment of the present disclosure.

FIG. 2 is a perspective view of an outer appearance of the rear surface side of the copy machine 1 according to the first embodiment of the present disclosure. FIG. 3 is a cross-sectional view illustrating a region in which the wiring cord cover 50 of the copy machine 1 is mounted according to the first embodiment of the present disclosure. FIG. 4 is a perspective view illustrating an outer appearance of the front surface side of the wiring cord cover 50 mounted to the apparatus body 2 according to the first embodiment of the present disclosure. FIG. 5 is an exploded perspective view illustrating a structure of the wiring cord cover 50 according to the first embodiment of the present disclosure. FIG. 6 is a perspective view illustrating a structure of a first cover member 51 according to the first embodiment of the present disclosure. FIG. 7 is a perspective view illustrating a structure of a second cover member 52 according to the first embodiment of the present disclosure. FIG. 8 is an enlarged perspective view illustrating a region in which the wiring cord cover 50 of the copy machine 1 is mounted according to the first embodiment of the present disclosure. FIG. 9 illustrates one of functions of the wiring cord cover 50 according to the first embodiment of the present disclosure.

As shown in FIG. 2, hinge units 45 are disposed on the rear surface side of the copy machine 1. The hinge units 45 are used to connect between the apparatus body 2 and the document sheet feed apparatus 40 such that the document sheet feed apparatus 40 is openable and closable relative to the apparatus body 2. The document sheet feed apparatus 40 is openable and closable relative to the document sheet placing surface 3 by means of the hinge units 45 that are paired and spaced from each other. More specifically, the document sheet feed apparatus 40 is pivotable about an axis line that extends in the width direction of the apparatus body 2 by using, as a pivot, the shaft portions of the hinge units 45.

The wiring cord cover 50 is disposed between the hinge units 45. The wiring cord cover 50 is mounted on the rear surface side of the apparatus body 2 so as to project upward of the document sheet placing surface 3 of the apparatus body 2. The document sheet feed apparatus 40 has an opening 46 on the rear surface side. The opening 46 is for avoiding interference between the document sheet feed apparatus 40 and the wiring cord cover 50. The wiring cord cover 50 is relatively fitted into the opening 46 in a state where the document sheet feed apparatus 40 is opened, and the wiring cord cover 50 covers the opening 46 in a state where the document sheet feed apparatus 40 is closed.

As shown in FIG. 3, the wiring cord cover 50 includes a guide portion 53 that surrounds the wiring cord C. The guide portion 53 surrounds the side portions of the wiring cord C in four directions. The guide portion 53 is opened more greatly than a conducting wire portion of the wiring cord C, and temporarily holds the wiring cord C such that the wiring cord C is movable relative to the guide portion 53 in the direction in which the wiring cord C extends. In the present embodiment, at the end of the wiring cord C, a connector (not shown) for connection to the apparatus body 2 is provided, and the guide portion 53 is opened more greatly than the connector portion, to allow the wiring cord C to pass therethrough.

The wiring cord cover 50 is detachably mounted to the apparatus body 2 (see an alternate long and two short dashes line shown in FIG. 3). In the present embodiment, the wiring cord cover 50 can be mounted to and detached from the apparatus body 2 in the depth direction on the rear surface side of the apparatus body 2. The apparatus body 2 includes an opening 4 on the rear surface side. The opening 4 is formed for mounting the wiring cord cover 50, and can be covered by the wiring cord cover 50. The wiring cord cover 50 is disposed over the opening 4 of the apparatus body 2 and the opening 46 of the document sheet feed apparatus 40, and is shaped such that the wiring cord C is guided so as to pass through the opening 4 and the opening 46.

As shown in FIG. 4, the wiring cord cover 50 has a plane surface portion 54 that is erected almost perpendicular to the document sheet placing surface 3 of the apparatus body 2. The plane surface portion 54 is oriented toward the near surface side of the apparatus body 2. Further, the wiring cord cover 50 has an inclined surface portion 55 that inclines relative to the document sheet placing surface 3 of the apparatus body 2. The inclined surface portion 55 is oriented toward the near surface side of the apparatus body 2 in the wiring cord cover 50, and is disposed between the document sheet placing surface 3 and the plane surface portion 54.

As shown in FIG. 5, the wiring cord cover 50 includes a first cover member 51 formed as a resin member, and a second cover member 52 formed as a resin member such that the first cover member 51 and the second cover member 52 are used in combination. The first cover member 51 includes the guide portion 53 and a sliding portion 56 that slides into and engages with the apparatus body 2. The second cover member 52 includes engaging shaft portions 57 and a fixing portion 58. The engaging shaft portions 57 engage with the first cover member 51 and allow the second cover member 52 to be openable and closable relative to the rear portion of the first cover member 51. The fixing portion 58 is fixed to the apparatus body 2 by means of a fastening member 59.

The opening 4 of the apparatus body 2 is formed over the apparatus top surface and the apparatus rear surface. In an apparatus top surface portion around the opening 4 of the apparatus body 2, ribs 5 are provided so as to engage with the sliding portion 56. The ribs 5 are provided on the inner side surface around the opening 4, and extend in the depth direction of the apparatus body 2. Further, in an apparatus rear surface portion around the opening 4 of the apparatus body 2, a hole 6 into which the fastening member 59 is screwed is formed. The hole 6 is formed in the bottom side portion of the opening 4.

Figure 6A:
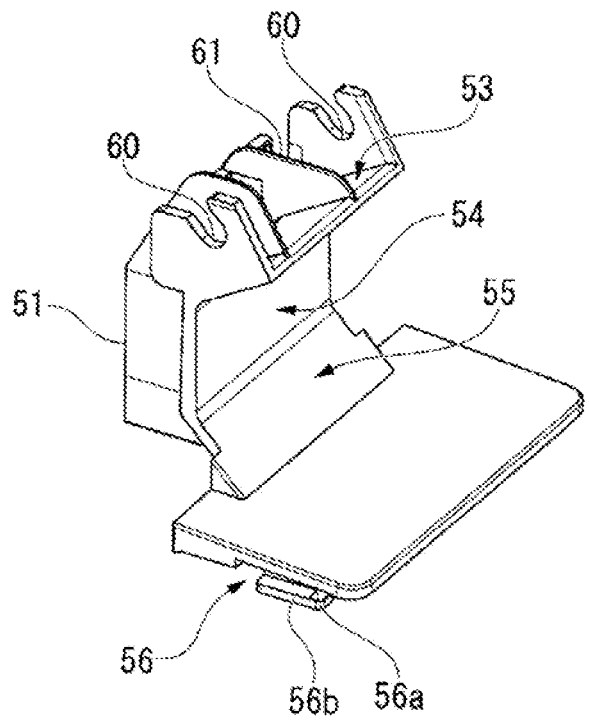
FIG. 6A and FIG. 6B are each a perspective view illustrating a structure of a first cover member according to the first embodiment of the present disclosure.
Figure 6B:
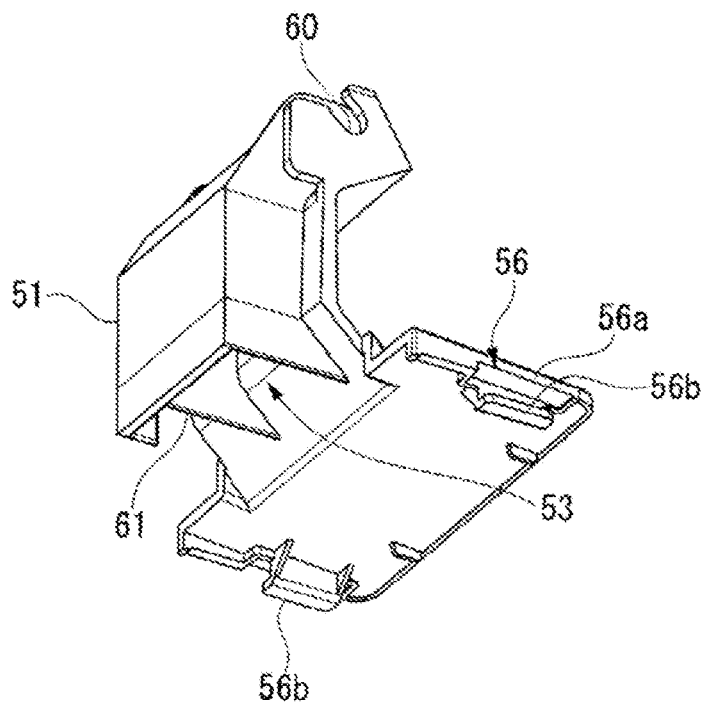

The sliding portion 56 of the first cover member 51 has a grove-like shape so as to slide along the ribs 5. As shown in FIG. 6A and FIG. 6B, the sliding portion 56 includes a plate portion 56a that is provided so as to be almost flush with the document sheet placing surface 3, and guide pieces 56b provided on the reverse side of the plate portion 56a. A distance between the plate portion 56a and each guide piece 56b is determined according to the thickness of the rib 5. Thus, the first cover member 51 slides so as to sandwich the ribs 5 between the plate portion 56a and the guide pieces 56b, thereby engaging with the apparatus body 2.

The first cover member 51 has shaft receiving grooves 60 that receive the engaging shaft portions 57 of the second cover member 52. The shaft receiving grooves 60 are provided in the upper portion of the first cover member 51 on both side portions of the guide portion 53. As shown in FIG. 7A, the second cover member 52 includes the engaging shaft portions 57 that engage with the shaft receiving grooves 60. The second cover member 52 covers the rear portion of the first cover member 51, and includes the cylindrical engaging shaft portions 57 on the side surfaces of the upper portion of the second cover member 52. By the engaging shaft portions 57 engaging with the shaft receiving grooves 60, the second cover member 52 is pivotable about the axis line that extends in the width direction of the first cover member 51 by using the engaging shaft portions 57 as a pivot.

Figure 7B:
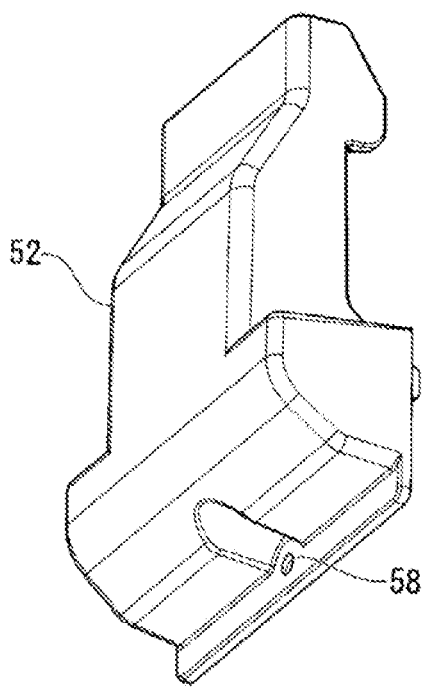

As shown in FIG. 7B, the second cover member 52 includes the fixing portion 58 at the lower portion thereof. The fixing portion 58 is formed into such a hole-like shape that a screw portion of the fastening member 59 can be inserted. The fixing portion 58 is positioned so as to connect with the hole 6 shown in FIG. 5 in a state where the second cover member 52 covers the rear portion of the first cover member 51. Namely, when the second cover member 52 is fixed to the apparatus body 2 by means of the fastening member 59 in a state where the first cover member 51 is temporarily fixed to the apparatus body 2 by the sliding portion 56, the first cover member 51 can be simultaneously pressed and fixed.

As shown in FIG. 8, the wiring cord C includes a first wiring cord C1 through which an image signal of an image read by the second document sheet reading portion 43 is transmitted and a second wiring cord C2 that is one or more wiring cords other than the first wiring cord C1. The second wiring cord C2 includes a power supply cord for a driving system of the document sheet feed apparatus 40. The wiring cord cover 50 includes a rib 61 that separates between the first wiring cord C1 and the second wiring cord C2 in the guide portion 53. The guide portion 53 is separated into two regions by the rib 61. The first wiring cord C1 is guided in one opening and the second wiring cord C2 is guided in the other opening.

Next, an operation of the wiring cord cover 50, for the wiring cord C, which is disposed between the apparatus body 2 and the document sheet feed apparatus 40, according to the present embodiment, will be described.

In the present embodiment, the wiring cord cover 50 includes the guide portion 53 that surrounds the wiring cord C as shown in FIG. 3, and the wiring cord cover 50 having the wiring cord C disposed therein is detachably mounted to the apparatus body 2. In this structure, the wiring cord C is extended and temporarily held in the guide portion 53 of the wiring cord cover 50. The wiring cord cover 50 with the wiring cord C in this state can be mounted to the apparatus body 2. Therefore, in assembling work, attention for preventing the wiring cord C from being caught need not be paid.

Specifically, as shown in FIG. 5, the wiring cord cover 50 includes the first cover member 51 having: the guide portion 53; and the sliding portion 56 which slides into and engages with the apparatus body 2, and the second cover member 52 that has: the engaging shaft portions 57 that engage with the first cover member 51, and allow the second cover member 52 to be openable and closable relative to the rear portion of the first cover member 51; and the fixing portion 58 that can be fixed to the apparatus body 2 by means of the fastening member 59. In the assembling work in this structure, the wiring cord C is firstly extended in the guide portion 53, and the wiring cord C is temporarily held by the first cover member 51.

Next, the first cover member 51 that temporarily holds the wiring cord C is temporarily fixed to the apparatus body 2 by means of the sliding portion 56. In this state, for example, an excess portion of the wiring cord C is tucked into the opening 4 or the like (see FIG. 8). Next, the engaging shaft portions 57 of the second cover member 52 are engaged with the shaft receiving grooves 60 of the first cover member 51 that is temporarily fixed. The second cover member 52 is pivoted about the engaging shaft portions 57 as a pivot, and thus encloses the rear portion of the first cover member 51 so as to cover the first cover member 51. Thus, the wiring cord C is prevented from being exposed to the outside.

Finally, the fastening member 59 is caused to pass through the fixing portion 58 of the second cover member 52, and is screwed into the hole 6 of the apparatus body 2, so that the second cover member 52 is fixed in a state where the rear portion of the first cover member 51 is enclosed. Since the second cover member 52 is fixed in a state where the second cover member 52 covers the rear portion of the first cover member 51, the first cover member 51 is also fixed by the second cover member 52 being fastened and fixed merely at one position, thereby reducing time for the assembling work.

In the present embodiment, as shown in FIG. 1, the first document sheet reading portion 20 is mounted to the apparatus body 2 and the second document sheet reading portion 43 is also mounted to the document sheet feed apparatus 40, to allow both side surfaces of a document sheet to be scanned. In this case, the wiring cord C (the first wiring cord C1) is necessary for transmitting, to the apparatus body 2, an image signal of an image read by the document sheet feed apparatus 40. When the first wiring cord C1, and a power supply cord and the like (the second wiring cord C2), for a driving system, other than the first wiring cord C1 are positioned lateral to each other, concern for influence of noise on the image signal may be caused. Therefore, in the present embodiment, as shown in FIG. 8, the rib 61 is provided in the guide portion 53 to separate between the first wiring cord C1 and the second wiring cord C2, thereby enabling stable transmission of the image signal.

Further, in the present embodiment, as shown in FIG. 2, the document sheet feed apparatus 40 is openable and closable by the hinge units 45 that are paired and spaced from each other. The wiring cord cover 50 is positioned between the hinge units 45, and includes the plane surface portion 54 that is erected almost perpendicular to the document sheet placing surface 3 of the apparatus body 2 as shown in FIG. 4. As shown in FIG. 9, when the document sheet feed apparatus 40 is opened in a state where a document sheet (denoted by reference character P in FIG. 9) is placed on the document sheet placing surface 3, the document sheet may be attached to the document sheet feed apparatus 40 and lifted. In this case, the document sheet may be drawn toward the rear surface of the apparatus body 2 through a gap between the apparatus body 2 and the document sheet feed apparatus 40. However, when the wiring cord cover 50 is disposed between the hinge units 45, falling of the document sheet may be prevented. Further, the wiring cord cover 50 contacts with the document sheet on the plane surface portion 54. Therefore, the edge of the document sheet can be received by a surface instead of a point, whereby a damage caused when the document sheet contacts with the wiring cord cover 50 may be reduced.

Thus, according to the embodiment described above, in the copy machine 1 that includes: the apparatus body 2 having therein the first document sheet reading portion 20; the document sheet feed apparatus 40 that is openable and closable relative to the document sheet placing surface 3 of the apparatus body 2; and the wiring cord C that electrically connects between the document sheet feed apparatus 40 and the apparatus body 2, the wiring cord cover 50 is provided which includes the guide portion 53 that surrounds the wiring cord C, and which is detachably mounted to the apparatus body 2 in a state where the wiring cord cover 50 has the wiring cord C disposed therein. Thus, in this structure, the wiring cord C is extended and temporarily fixed in the guide portion 53 of the wiring cord cover 50, and the wiring cord cover 50 in this state can be mounted to the apparatus body 2. Therefore, in the assembling work, attention for preventing the wiring cord C from being caught need not be paid.

Second Embodiment

Next, a second embodiment of the present disclosure will be described. In the below description, the same or corresponding components as described for the above embodiment, are denoted by the same reference numerals, and the description thereof will be simplified or omitted.

Figure 10:
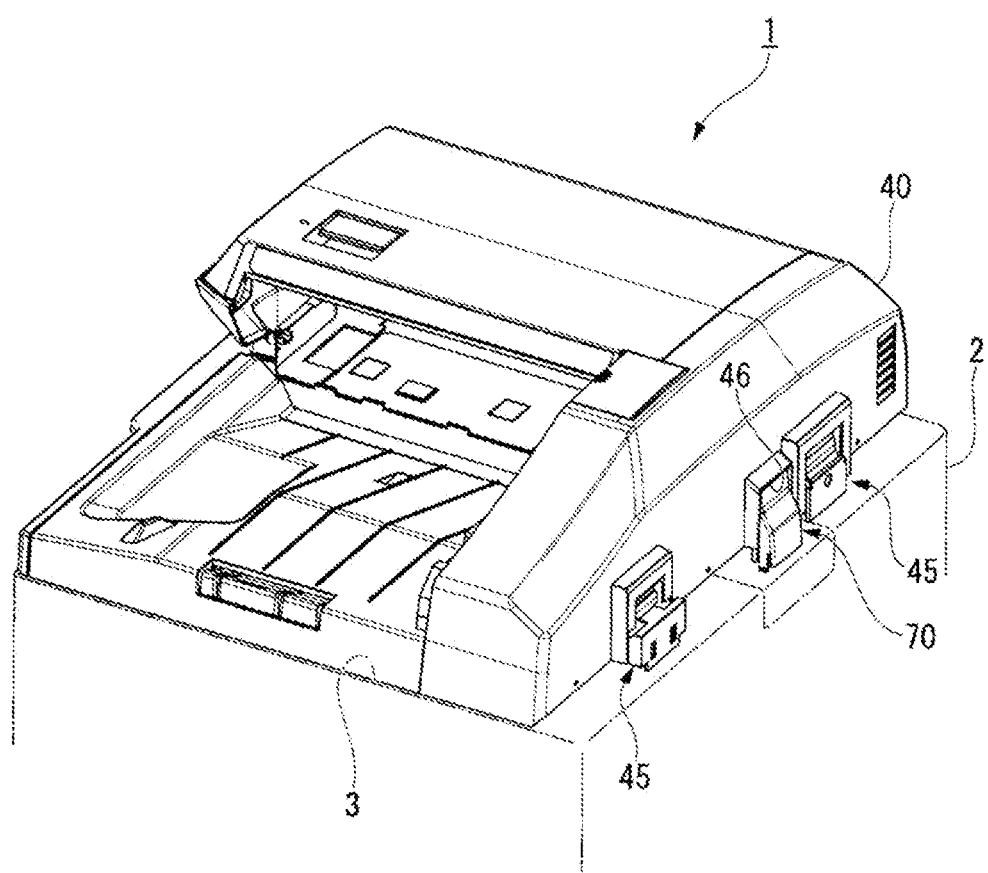
FIG. 10 is a perspective view of an outer appearance of a rear surface side of a copy machine according to a second embodiment of the present disclosure.
Figure 11:
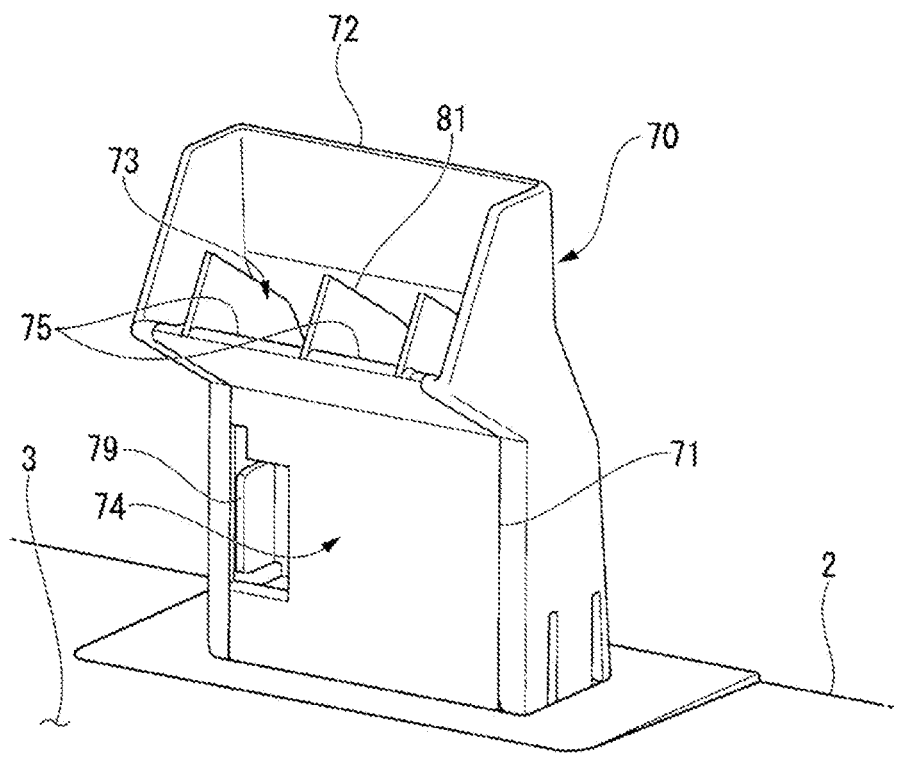
FIG. 11 is a perspective view of an outer appearance of a front surface side of a wiring cord cover mounted to the apparatus body according to the second embodiment of the present disclosure.
Figure 12:
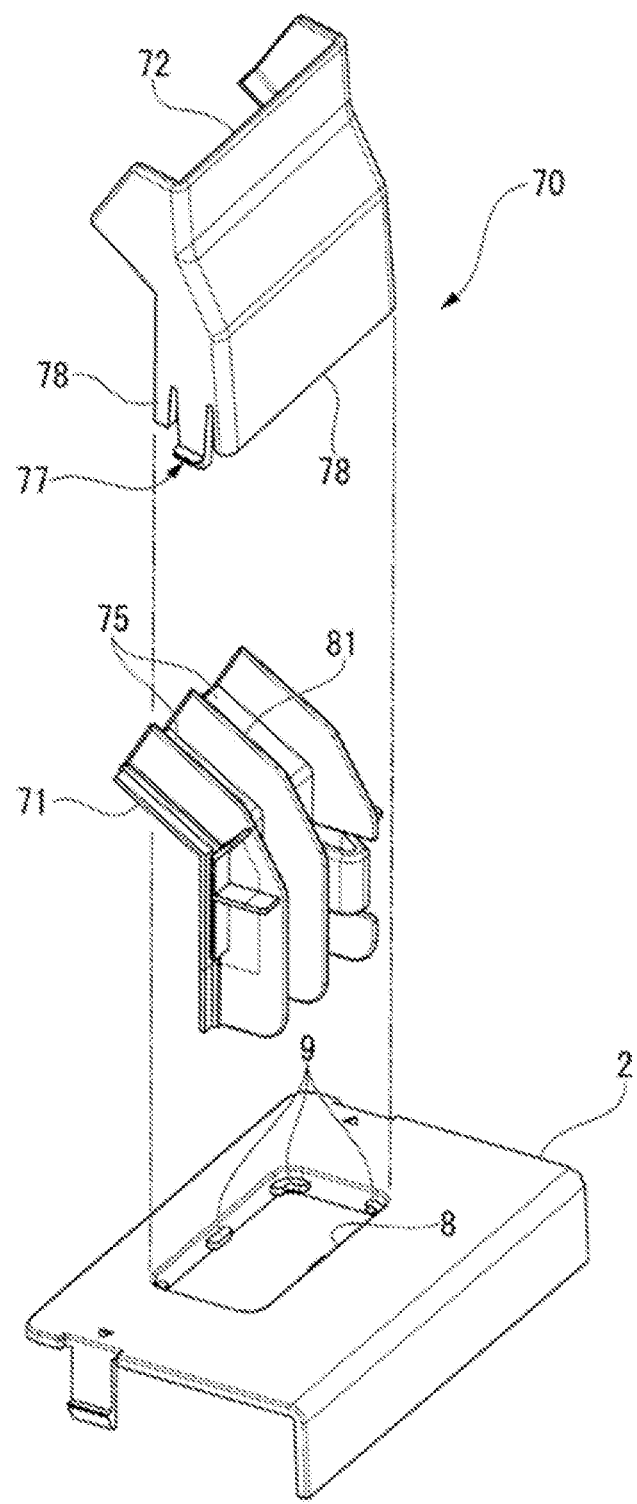
FIG. 12 is an exploded perspective view illustrating a structure of the wiring cord cover according to the second embodiment of the present disclosure.

FIG. 10 is a perspective view of an outer appearance of the rear surface side of the copy machine 1 according to the second embodiment of the present disclosure. FIG. 11 is a perspective view of an outer appearance of the front surface side of a wiring cord cover 70 mounted to the apparatus body 2 according to the second embodiment of the present disclosure. FIG. 12 is an exploded perspective view illustrating a structure of the wiring cord cover 70 according to the second embodiment of the present disclosure. FIG. 13 and FIG. 14 are each a perspective view illustrating a structure of a first cover member 71 according to the second embodiment of the present disclosure. FIG. 15 is a perspective view illustrating a structure of a second cover member 72 according to the second embodiment of the present disclosure.

As shown in FIG. 10, the wiring cord cover 70 is disposed between the hinge units 45. The wiring cord cover 70 is mounted on the rear surface side of the apparatus body 2 so as to project upward of the document sheet placing surface 3 of the apparatus body 2.

As shown in FIG. 11, the wiring cord cover 70 has a guide portion 73 that surrounds the wiring cord C (not shown). The wiring cord cover 70 includes a rib 81 that separates between the first wiring cord C1 (not shown) and the second wiring cord C2 (not shown) in the guide portion 73. Further, the wiring cord cover 70 includes a plane surface portion 74 that is erected almost perpendicular to the document sheet placing surface 3 of the apparatus body 2.

As shown in FIG. 12, the wiring cord cover 70 includes the first cover member 71 formed as a resin member and the second cover member 72 formed as a resin member such that the first cover member 71 and the second cover member 72 are used in combination. The first cover member 71 includes grooves 75 that form a part of the guide portion 73. The second cover member 72 includes: sliding portions 76 (see FIG. 15) that slide on and engage with the first cover member 71, to close opening of the grooves 75, thereby forming the guide portion 73; and hook portions 77 which are latched by the apparatus body 2.

As shown in FIG. 12, the apparatus body 2 has an opening 8 on the apparatus top surface. The opening 8 is formed into a rectangular shape. Ribs 9 for supporting the wiring cord cover 70 are provided on the inner side surface around the opening 8.

Figure 15A:
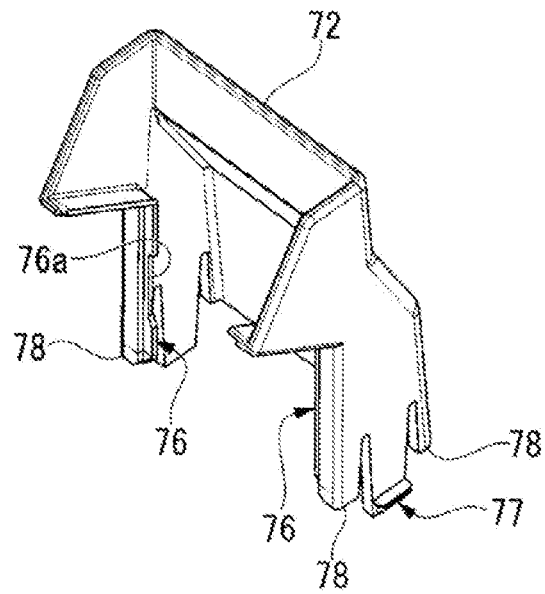
FIG. 15A and FIG. 15B are each a perspective view illustrating a structure of a second cover member according to the second embodiment of the present disclosure.
Figure 15B:
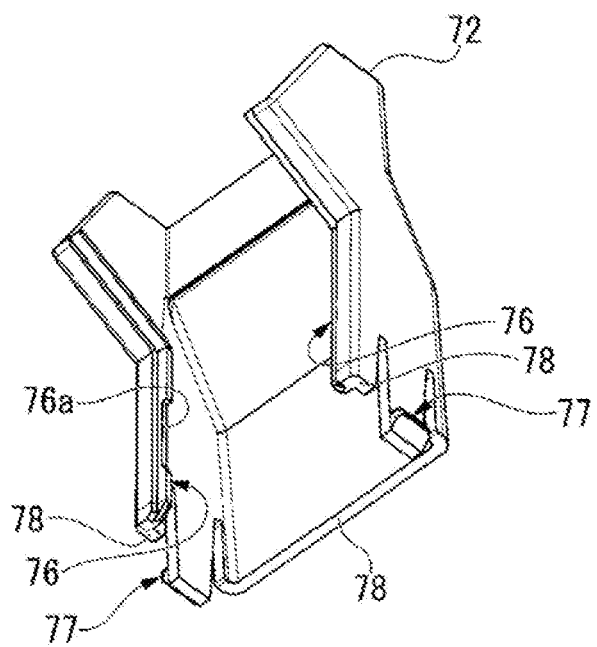

As shown in FIG. 15A and FIG. 15B, the second cover member 72 includes leg portions 78 that are positioned so as to stand on the ribs 9. The second cover member 72 has the hook portions 77 that extend below the leg portions 78. The hook portions 77 are latched at the edge, on the reverse side, of the opening 8.

The sliding portions 76 of the second cover member 72 have a rib-like shape. The sliding portions 76 are provided on the side surfaces, respectively, of the inner surface of the second cover member 72 that can cover the rear portion of the first cover member 71. A recess 76a into which a stopper 79 described below is fitted is formed on one of the sliding portions 76.

Figure 13A:
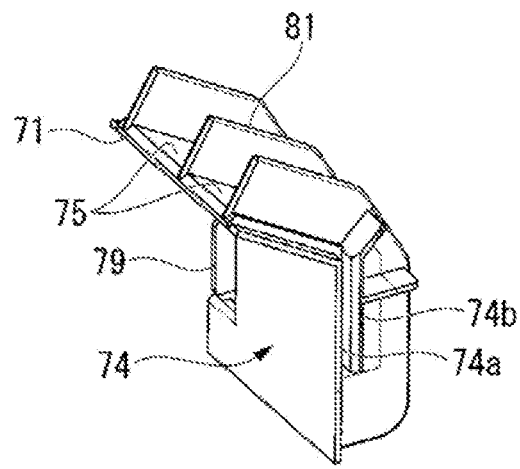
FIG. 13A and FIG. 13B are each a perspective view illustrating a structure of a first cover member according to the second embodiment of the present disclosure.
Figure 13B:
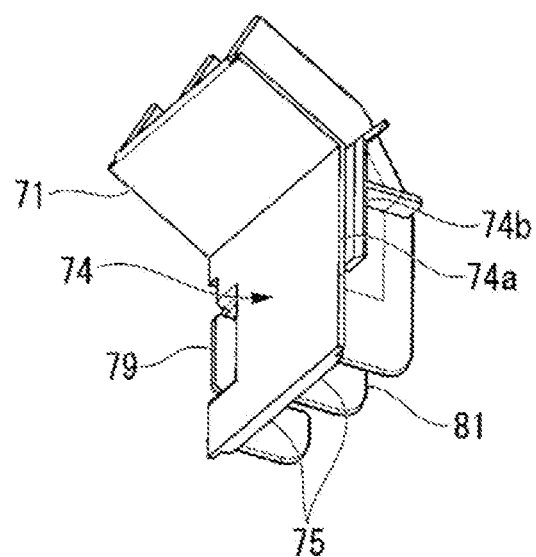

As shown in FIG. 13A and FIG. 13B, the first cover member 71 includes a plate portion 74a and guide pieces 74b on which the sliding portions 76 slide. The front surface side of the plate portion 74a forms the plane surface portion 74. The guide pieces 74b are provided on the reverse side of the plate portion 74a.

A distance between the plate portion 74a and each guide piece 74b is determined according to the thickness of the sliding portions 76. Thus, the second cover member 72 engages with the first cover member 71 by the sliding portions 76 being sandwiched and slid between the plate portion 74a and the guide pieces 74b.

Figure 14A:
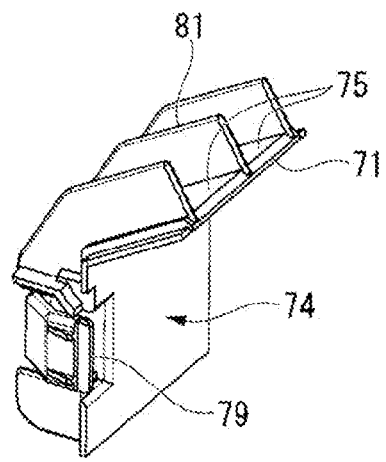
FIG. 14A, FIG. 14B, and FIG. 14C are each a perspective view illustrating the structure of the first cover member according to the second embodiment of the present disclosure.
Figure 14B:
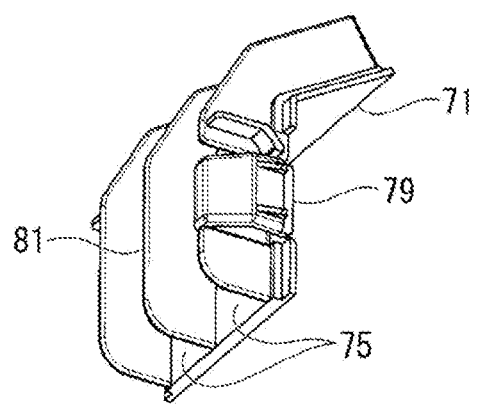
Figure 14C:
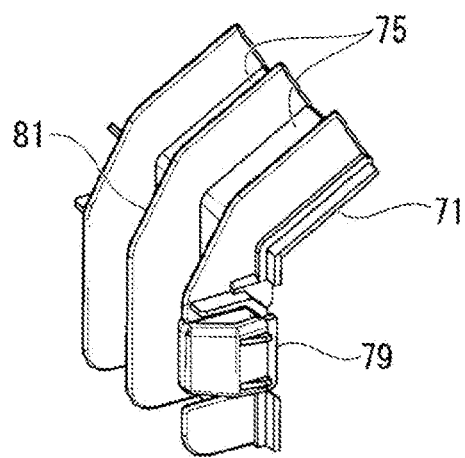

As shown in FIG. 14A to FIG. 14C, the first cover member 71 includes the stopper 79. The stopper 79 can be switched between a first position at which sliding of the second cover member 72 on the first cover member 71 is prevented, and a second position at which prevention of sliding of the second cover member 72 on the first cover member 71 is released.

At the first position, the stopper 79 is fitted into the recess 76a of the sliding portions 76. On the other hand, at the second position, the stopper 79 is disengaged from the recess 76a of the sliding portions 76. In the present embodiment, the first cover member 71 is formed by resin material, and the stopper 79 is movable due to its spring property. The stopper 79 is positioned at the first position in the normal state. When the stopper 79 is warped against a restoring force of the material, the stopper 79 can be positioned at the second position.

Next, an operation of the wiring cord cover 70, for the wiring cord C, which is disposed between the apparatus body 2 and the document sheet feed apparatus 40, according to the second embodiment, will be described.

As shown in FIG. 12, the wiring cord cover 70 includes the first cover member 71 having the grooves 75 that form a part of the guide portion 73, and the second cover member 72 that has: the sliding portions 76 (see FIG. 15) which slide on and engage with the first cover member 71, to close opening of the grooves 75, thereby forming the guide portion 73; and the hook portions 77 that are latched by the apparatus body 2. In the assembling work in this structure, the wiring cord C is firstly extended along the grooves 75 of the first cover member 71.

Next, the second cover member 72 is slid by the sliding portions 76 so as to cover the first cover member 71 in which the wiring cord C is extended, to assemble the first cover member 71 and the second cover member 72. Thus, the opening of the grooves 75 is closed to form the guide portion 73 that surrounds the wiring cord C (see FIG. 11). The first cover member 71 and the second cover member 72 are assembled along the grooves 75 as shown in FIG. 12. Therefore, the wiring cord C can be temporarily held by the wiring cord cover 70 so as to prevent the wiring cord C from being caught.

The wiring cord cover 70 includes the stopper 79 that can be switched between the first position at which sliding of the second cover member 72 on the first cover member 71 is prevented, and the second position at which prevention of sliding of the second cover member 72 on the first cover member 71 is released. Thus, the stopper 79 is provided so as to allow switching between prevention of sliding of the first cover member 71 and the second cover member 72 on each other and releasing of the prevention of the sliding. Therefore, the wiring cord cover 70 is assembled, and thereafter the wiring cord cover 70 is disassembled and wiring work is performed, and the wiring cord cover 70 can be then reassembled.

Finally, the wiring cord cover 70 is inserted into the opening 8 of the apparatus body 2, and latched on the reverse side of the opening 8 by means of the hook portions 77 provided in the second cover member 72. The first cover member 71 and the second cover member 72 are integrally fixed to the apparatus body 2, thereby reducing time for assembling work.

Further, according to the second embodiment, as in the above embodiment, the wiring cord C is extended and temporarily held in the guide portion 73 of the wiring cord cover 70, and the wiring cord cover 70 with the wiring cord C in this state can be mounted to the apparatus body 2. Therefore, in assembling work, attention for preventing the wiring cord C from being caught need not be paid.

Although preferred embodiments of the present disclosure have been thus described with reference to the drawings, the present disclosure is not limited to the above embodiments. The shapes, combinations, and the like of the components described in the above embodiments are exemplary ones. Various modifications can be made based on design requirements and the like without departing from the gist of the present disclosure.

Figure 16:
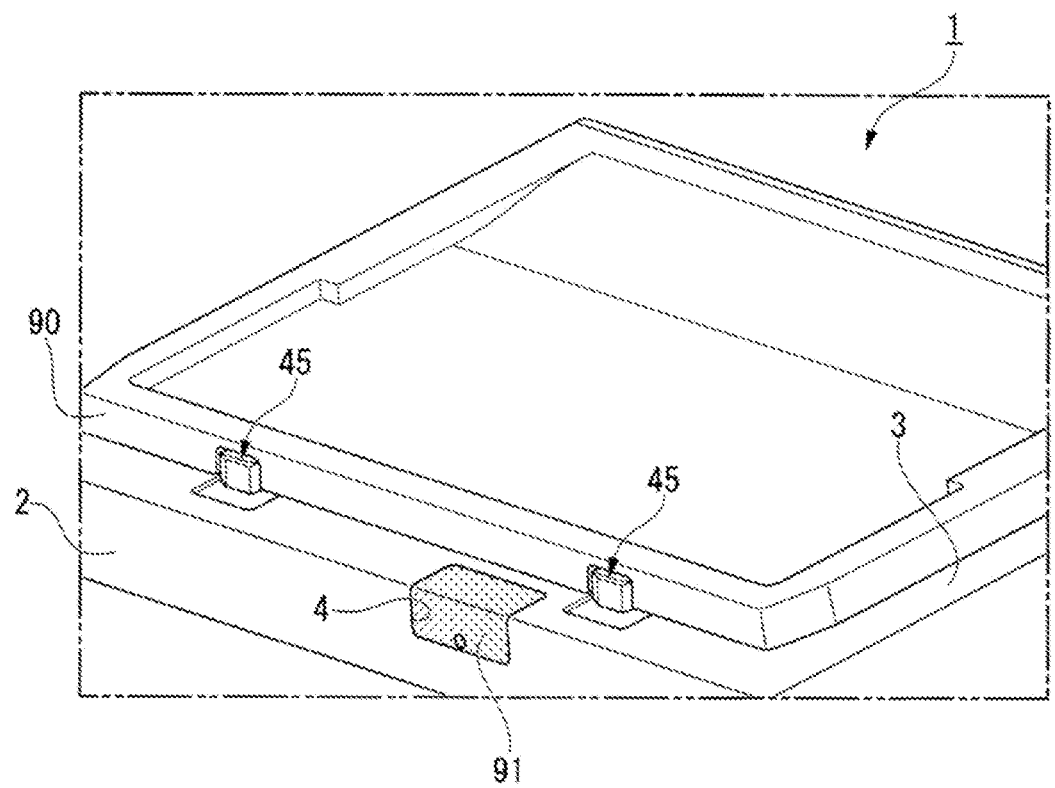
FIG. 16 is a perspective view of an outer appearance of a rear surface side of a copy machine according to another embodiment of the present disclosure.

For example, as shown in FIG. 16, when a platen cover 90 is mounted to the apparatus body 2 without mounting the document sheet feed apparatus 40, a third cover member 91 may be mounted in the opening 4 of the apparatus body 2. When the document sheet feed apparatus 40 is not mounted, if a part of the wiring cord cover projects as described for the wiring cord cover 50 in the first embodiment, interference may be caused when the platen cover 90 is being mounted. Therefore, the third cover member 91 is mounted without using the wiring cord cover 50, to enable the opening 4 to be covered.

In the above embodiments, an exemplary case is described where the wiring case cover is formed by the first cover member and the second cover member being combined. However, the present disclosure in which, for example, the first cover member and the second cover member are previously integrated with each other, may be implemented.

Further, in the above embodiments, an exemplary case is described where the image forming apparatus is a copy machine. However, the present disclosure is also applicable to an image forming apparatus such as a printer and a facsimile apparatus.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an apparatus body including a document sheet reading portion therein;
   a document sheet feed apparatus configured to be openable and closable relative to a document sheet placing surface of the apparatus body;
   a wiring cord whose one end is connected to the document sheet feed apparatus and whose other end is connected to the apparatus body, the wiring cord being passed through openings that are respectively provided on outer surfaces of the apparatus body and the document sheet feed apparatus, and configured to electrically connect between the apparatus body and the document sheet feed apparatus;
   a guide portion configured to surround the wiring cord and temporarily hold the wiring cord such that the wiring cord is movable relative to the guide portion in a direction in which the wiring cord extends; and
   a wiring cord cover mounted detachably to the apparatus body in a state where the wiring cord cover has the wiring cord disposed therein, wherein
   the wiring cord is temporarily held in the guide portion, and the other end of the wiring cord is connected to the apparatus body, and
   the wiring cord cover includes:
      a first cover member having the guide portion and a sliding portion that slides into and engages with the apparatus body, and
      a second cover member that includes:
         an engagement shaft portion that engages with the first cover member and allows the second cover member to be openable and closeable relative to a rear portion of the first cover member; and
         a fixed portion that is fixed to the apparatus body by a fastening member.

2. The image forming apparatus according to claim 1, wherein
   the document sheet feed apparatus includes a second document sheet reading portion that reads one surface of a document sheet,
   the wiring cord includes a first wiring cord through which an image signal of an image read by the second document sheet reading portion is transmitted, and a second wiring cord that is a wiring cord other than the first wiring cord, and
   the wiring cord cover includes a rib that separates between the first wiring cord and the second wiring cord in the guide portion.

3. The image forming apparatus according to claim 1, wherein the wiring cord cover covers the openings.

4. An image forming apparatus comprising:
   an apparatus body including a document sheet reading portion therein;
   a document sheet feed apparatus configured to be openable and closable relative to a document sheet placing surface of the apparatus body;
   a wiring cord whose one end is connected to the document sheet feed apparatus and whose other end is connected to the apparatus body, the wiring cord being passed through openings that are respectively provided on outer surfaces of the apparatus body and the document sheet feed apparatus, and configured to electrically connect between the apparatus body and the document sheet feed apparatus;
   a guide portion configured to surround the wiring cord and temporarily hold the wiring cord such that the wiring cord is movable relative to the guide portion in a direction in which the wiring cord extends; and
   a wiring cord cover mounted detachably to the apparatus body in a state where the wiring cord cover has the wiring cord disposed therein, wherein
   the wiring cord is temporarily held in the guide portion, and the other end of the wiring cord is connected to the apparatus body, and
   the wiring cord cover includes:
      a first cover member having a groove portion that forms a part of the guide portion, and
      a second cover member that has:
         a sliding portion which slides on and engages with the first cover member and closes an opening of the groove portion to form the guide portion; and
         a hook portion that is latched by the apparatus body.

5. The image forming apparatus according to claim 4, wherein the wiring cord cover includes a stopper that is switchable between a first position at which sliding of the second cover member on the first cover member is prevented, and a second position at which prevention of sliding of the second cover member on the first cover member is released.

6. The image forming apparatus according to claim 4, wherein
   the document sheet feed apparatus includes a second document sheet reading portion that reads one surface of a document sheet,
   the wiring cord includes a first wiring cord through which an image signal of an image read by the second document sheet reading portion is transmitted, and a second wiring cord that is a wiring cord other than the first wiring cord, and the wiring cord cover includes a rib that is positioned between and separates the first wiring cord and the second wiring cord in the guide portion.

7. An image forming apparatus comprising:

an apparatus body including a document sheet reading portion therein;

a document sheet feed apparatus configured to be openable and closable relative to a document sheet placing surface of the apparatus body;

a wiring cord whose one end is connected to the document sheet feed apparatus and whose other end is connected to the apparatus body, the wiring cord being passed through openings that are respectively provided on outer surfaces of the apparatus body and the document sheet feed apparatus, and configured to electrically connect between the apparatus body and the document sheet feed apparatus;

a guide portion configured to surround the wiring cord and temporarily hold the wiring cord such that the wiring cord is movable relative to the guide portion in a direction in which the wiring cord extends; and a wiring cord cover mounted detachably to the apparatus body in a state where the wiring cord cover has the wiring cord disposed therein, wherein the wiring cord is temporarily held in the guide portion, and the other end of the wiring cord is connected to the apparatus body, the document sheet feed apparatus is openable and closable by a pair of hinge units spaced from each other, and the wiring cord cover is provided between the hinge units and has a plane surface portion that is erected almost perpendicular to the document sheet placing surface of the apparatus body.

8. The image forming apparatus according to claim 7, wherein the document sheet feed apparatus includes a second document sheet reading portion that reads one of surfaces of a document sheet, the wiring cord includes a first wiring cord through which an image signal of an image read by the second document sheet reading portion is transmitted, and a second wiring cord that is a wiring cord other than the first wiring cord, and the wiring cord cover includes a rib that is positioned between and separates the first wiring cord and the second wiring cord in the guide portion.

* * * * *